(12) United States Patent
Oshige et al.

(10) Patent No.: US 9,803,268 B2
(45) Date of Patent: Oct. 31, 2017

(54) IRON-BASE SINTERED ALLOY MATERIAL FOR VALVE SEAT INSERT AND METHOD FOR MANUFACTURING THE SAME

(71) Applicant: NIPPON PISTON RING CO., LTD., Saitama (JP)

(72) Inventors: Hiroshi Oshige, Tochigi (JP); Satoshi Ikemi, Tochigi (JP)

(73) Assignee: NIPPON PISTON RING CO., LTD., Saitama (JP)

( * ) Notice: Subject to any disclaimer, the term of this patent is extended or adjusted under 35 U.S.C. 154(b) by 166 days.

(21) Appl. No.: 14/674,525

(22) Filed: Mar. 31, 2015

(65) Prior Publication Data

US 2015/0275343 A1 Oct. 1, 2015

(30) Foreign Application Priority Data

Mar. 31, 2014 (JP) .................................. 2014-072547

(51) Int. Cl.
*C22C 38/50* (2006.01)
*C22C 38/58* (2006.01)
(Continued)

(52) U.S. Cl.
CPC ................ *C22C 38/58* (2013.01); *B22F 3/12* (2013.01); *B22F 5/008* (2013.01); *B22F 5/10* (2013.01);
(Continued)

(58) Field of Classification Search
None
See application file for complete search history.

(56) References Cited

U.S. PATENT DOCUMENTS 6,951,579 B2 10/2005 Koyama
7,089,902 B2 8/2006 Sato et al.
(Continued)

FOREIGN PATENT DOCUMENTS

CN 1517518 8/2004
CN 1837397 9/2006
(Continued)

OTHER PUBLICATIONS

European Search Report dated Aug. 28, 2015; Application No. 15162059.8.
(Continued)

*Primary Examiner* — Jessee Roe
*Assistant Examiner* — Ngoclan T Mai
(74) *Attorney, Agent, or Firm* — Young & Thompson

(57) ABSTRACT

An iron-base sintered alloy material includes a matrix phase, Co base inter-metallic compound particles having hardness of 600 to 1200 HV, carbide-type particles having hardness of 400 to 700 HV, and optionally solid-lubricant particles, the particles being dispersed in the matrix phase. A matrix part including the matrix phase and the two kinds of hard-particles contains 0.3 to 1.5% by mass of C, and 10 to 50% by mass of one or more kinds selected from Si, Mo, Cr, Ni, Co, Mn, S, N, V, Ca, F, Mg, and O, the balance being Fe and unavoidable impurities. By dispersing, in the matrix phase, the Co base inter-metallic compound particles having high hardness, and the carbide-type particles having low hardness and low aggressiveness to mated material and increasing mechanical strength, wear-resistance can be improved with low aggressiveness to mated material and high radial crushing strength (350 MPa or more).

18 Claims, 1 Drawing Sheet

(51) Int. Cl.
*B22F 3/12* (2006.01)
*B22F 5/10* (2006.01)
*C22C 1/04* (2006.01)
*C22C 1/05* (2006.01)
*C22C 38/00* (2006.01)
*C22C 38/02* (2006.01)
*C22C 38/04* (2006.01)
*C22C 38/44* (2006.01)
*C22C 38/46* (2006.01)
*C22C 38/52* (2006.01)
*F01L 3/08* (2006.01)
*C22C 33/02* (2006.01)
*F01L 3/02* (2006.01)
*B23P 15/00* (2006.01)
*B22F 5/00* (2006.01)
*B22F 1/00* (2006.01)

(52) U.S. Cl.
CPC ............ *B22F 5/106* (2013.01); *B23P 15/002* (2013.01); *C22C 1/0491* (2013.01); *C22C 1/05* (2013.01); *C22C 33/0207* (2013.01); *C22C 33/0285* (2013.01); *C22C 33/0292* (2013.01); *C22C 38/002* (2013.01); *C22C 38/02* (2013.01); *C22C 38/04* (2013.01); *C22C 38/44* (2013.01); *C22C 38/46* (2013.01); *C22C 38/52* (2013.01); *F01L 3/02* (2013.01); *F01L 3/08* (2013.01); *B22F 1/0059* (2013.01)

(56) References Cited

U.S. PATENT DOCUMENTS

| | | | |
|---|---|---|---|
| 7,273,508 | B2 | 9/2007 | Sato et al. |
| 8,733,313 | B2* | 5/2014 | Sato ..................... C22C 1/0491 |
| | | | 123/188.8 |
| 2005/0193861 | A1 | 9/2005 | Sato et al. |
| 2011/0023808 | A1 | 2/2011 | Sato et al. |
| 2013/0291822 | A1 | 11/2013 | Takahashi et al. |

FOREIGN PATENT DOCUMENTS

| | | | |
|---|---|---|---|
| CN | 103328776 | | 9/2013 |
| EP | 1347068 | | 9/2003 |
| EP | 2666981 | | 11/2013 |
| GB | 2370281 | * | 6/2002 |
| JP | 2005-248234 | | 9/2005 |
| JP | 2006299404 | | 11/2006 |
| WO | WO 2009/122985 | | 10/2009 |

OTHER PUBLICATIONS

Chinese Office Action in corresponding Chinese Patent Application No. 201510146629.1 with English translation of Chinese Office Action, dated Jun. 2016.

* cited by examiner

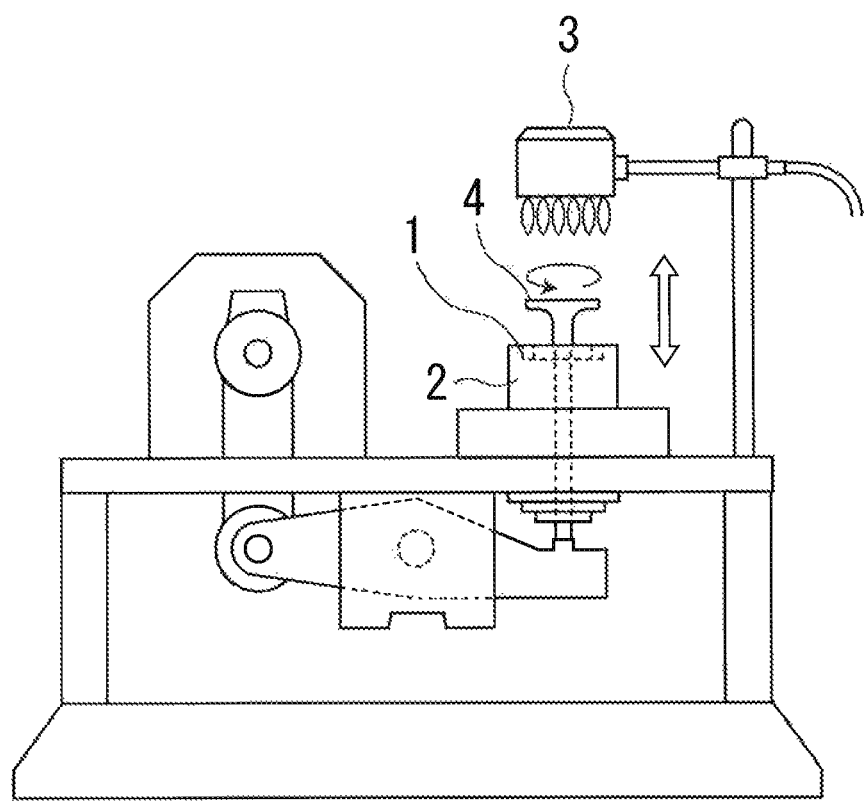

IRON-BASE SINTERED ALLOY MATERIAL FOR VALVE SEAT INSERT AND METHOD FOR MANUFACTURING THE SAME

BACKGROUND

Technical Field

The present invention relates to an iron-base sintered alloy material suitable for a valve seat insert of an internal combustion engine, and particularly to further improving wear-resistance, reducing aggressiveness to mated material, and improving radial crushing strength, of the iron-base sintered alloy material.

Related Art

A valve seat insert of an internal combustion engine is press-fitted into a cylinder head to secure air-tightness in a combustion chamber and cool a valve. The valve seat insert seats a valve for opening and closing an intake hole and an exhaust hole. Therefore, for example, the valve seat insert is beaten by the valve, worn away by sliding, heated by combustion gas, and corroded by combustion products.

Recently, an internal combustion engine for an automobile has been strongly requested to have a higher output power and a higher fuel efficiency. To satisfy the request, the valve seat insert to be used is under a severer environment. The valve seat insert is also strongly requested to have further improved wear-resistance.

With respect to such a request, for example, JP 2005-248234 A describes the following iron-base sintered alloy material for a valve seat insert. The material includes a Co-base inter-metallic compound having a particle diameter of 10 to 150 μm and hardness of 500 HP 0.1 or more and less than 800 HP 0.1 at an area ratio of 10 to 20%, and a Co-base inter-metallic compound having a particle diameter of 10 to 150 μm and hardness of 800 HP 0.1 or more and less than 1100 HP 0.1 at an area ratio of 15 to 35%. In the material, the Co-base inter-metallic compounds are dispersed at an area ratio of 25 to 55% in total. According to the technique described in JP 2005-248234 A, a valve seat insert having excellent wear-resistance and low aggressiveness to mated material is obtained.

WO 2009/122985A1 describes an iron-base sintered alloy material for a valve seat insert. The technique described in WO 2009/122985A1 is directed to an iron-base sintered alloy material having two kinds of hard-particles dispersed and contained therein. According to the technique described in WO 2009/122985A1, the iron-base sintered alloy material contains first hard-particles having an average primary particle diameter of 5 to 20 μm and second hard-particles having an average primary particle diameter of 20 to 150 μm. The first and second hard-particles are selectively used such that a difference in particle diameter between adjacent peak tops is from 15 to 100 μm among diameters corresponding to peak tops of mixed hard-particles obtained by mixing the first and second hard-particles. The first and second hard-particles are blended so as to occupy 10 to 60% by area in total. WO 2009/122985A1 describes that, as a result, when the iron-base sintered alloy material is used for a valve seat insert, wear-resistance can be improved, aggressiveness to mated material can be reduced, and mechanical strength can be improved, simultaneously.

SUMMARY OF INVENTION

According to the technique described in JP 2005-248234 A, an iron-base sintered alloy material having both excellent wear-resistance and low aggressiveness to mated material can be obtained. However, in the technique described in JP 2005-248234 A, a large amount of hard-particles are dispersed. As a result, disadvantageously, mechanical strength is decreased, and both excellent wear-resistance and high mechanical strength cannot be obtained. In the technique described in WO 2009/122985A1, when a large amount of fine hard-particles are contained, disadvantageously, hard-particles are cohered, are not likely to be dispersed uniformly, and the cohered hard-particles become a starting point of wear.

An object of the present invention is to solve such a problem in the related art and to provide an iron-base sintered alloy material for a valve seat insert having, as a valve seat insert, high mechanical strength (radial crushing strength), low aggressiveness to mated material, and excellent wear-resistance, simultaneously. Note that "radial crushing strength" here indicates a value of radial crushing strength measured in conformity to JIS Z 2507.

To achieve the above-described object, the present inventors have made intensive studies about various factors having an influence on wear-resistance, aggressiveness to mated material, and mechanical strength (radial crushing strength). As a result, the present inventors have found the following. By using hard-particles having low hardness in addition to hard-particles having high hardness, a total amount of the hard-particles can be increased without lowering radial crushing strength. In addition, wear-resistance can be improved without significantly increasing aggressiveness to mated material. The present inventors have also found that Co base inter-metallic compound particles are preferable for the hard-particles having high hardness and carbide-type hard-particles are preferable for the hard-particles having low hardness.

Furthermore, the present inventors have reached the following idea. That is, they mixed fine hard-particle powder having a small particle diameter and relatively coarse hard-particle powder having a large particle diameter for the hard-particles having high hardness, and adjusted the mixed powder to have a proper particle diameter distribution with two peak tops. The present inventors have found that, by using the mixed powder as raw material powder, a diffusion property in sintering is increased and radial crushing strength is further improved.

The present invention has been accomplished with further studies based on the finding. That is, the summary of the present invention is as follows.

(1) An iron-base sintered alloy material for a valve seat insert having excellent wear-resistance, including:
a matrix phase;
first hard-particles; and
second hard-particles,
wherein the first and second hard-particles have hardness different from each other and are dispersed in the matrix phase,
a matrix part including the matrix phase and the two kinds of hard-particles contains 0.3 to 1.5% by mass of C, and 10 to 50% by mass in total of one or more kinds selected from Si, Mo, Cr, Ni, Co, Mn, S, W, V, Ca, F, Mg, and C, the balance being Fe and unavoidable impurities,
the first hard-particles are Co base inter-metallic compound particles having Vickers hardness of 600 to 1200 HV,
the second hard-particles are carbide-type particles having Vickers hardness of 400 to 700 HV, and
the material has a structure including 2 to 45% by mass of the first hard-particles and 2 to 30% by mass of the second hard-particles, in which 10 to 50% by mass in total of the two kinds of hard-particles are dispersed, and has a density of 6.6 g/cm³ or more and radial crushing strength of 350 MPa or more.

(2) The iron-base sintered alloy material for a valve seat insert according to (1), wherein the Co base inter-metallic compound particles contain 20 to 60% by mass of Mo, 1 to 10% by mass of Si, and 5 to 70% by mass in total of one or more kinds selected from Cr, Ni, and Fe, the balance being Co and unavoidable impurities, and the carbide-type particles contain 0.5 to 1.5% by mass of C, 0.2 to 0.5% by mass of Si, 0.1 to 0.5% by mass of Mn, 2 to 6% by mass of Cr, 3 to 7% by mass of Mo, 4 to 8% by mass of N, and 1 to 3% by mass of V, the balance being Fe and unavoidable impurities.

(3) The iron-base sintered alloy material for a valve seat insert according to (2), wherein the Co base inter-metallic compound particles are blended in the form of mixed powder obtained by blending powder particles having an average particle diameter of 5 to 40 μm and powder particles having an average particle diameter of 40 to 100 μm.

(4) The iron-base sintered alloy material for a valve seat insert according to (2), wherein the carbide-type particles are blended as powder having a particle diameter distribution (—#100 mesh) passing through a #100 mesh sieve.

(5) The iron-base sintered alloy material for a valve seat insert according to any one of (1) to (4), wherein, in addition to the hard-particles, 0.2 to 5% by mass of solid-lubricant particles are dispersed in the matrix phase.

(6) A method for manufacturing an iron-base sintered alloy material for a valve seat insert, including:

blending and mixing, as raw material powder, iron-based powder, hard-particle powder, powder for an alloy, and optionally solid-lubricant particle powder to obtain mixed powder;

putting the mixed powder into a mold for molding to obtain a green compact having predetermined shape and density; and sintering the green compact to obtain a sintered body, wherein the hard-particle powder contains first hard-particle powder and second hard-particle powder, the first hard-particle powder is Co base inter-metallic compound particle powder having Vickers hardness of 600 to 1200 MV, the second hard-particle powder is carbide-type particle powder having Vickers hardness of 400 to 700 MV, the raw material powder is blended such that a matrix part including a matrix phase and hard-particles after sintering contains 0.3 to 1.5% by mass of C, and 10 to 50% by mass in total of one or more kinds selected from Si, Mo, Cr, Ni, Co, Mn, S, N, V, Ca, F, Mg, and O, the balance being Fe and unavoidable impurities, and a structure after sintering includes 2 to 45% by mass of the first hard-particles and 2 to 30% by mass of the second hard-particles, in which 10 to 50% by mass in total of these two kinds of hard-particles are contained, to obtain a sintered body having a density of 6.6 g/cm³ or more and radial crushing strength of 350 MPa or more.

(7) The method for manufacturing an iron-base sintered alloy material for a valve seat insert according to (6), wherein the Co base inter-metallic compound particle powder contains 20 to 60% by mass of Mo, 1 to 10% by mass of Si, and 5 to 70% by mass in total of one or more kinds selected from Cr, Ni, and Fe, the balance being Co and unavoidable impurities, and the carbide-type particle powder contains 0.5 to 1.5% by mass of C, 0.2 to 0.5% by mass of Si, 0.1 to 0.5% by mass of Mn, 2 to 6% by mass of Cr, 3 to 7% by mass of Mo, 4 to 8% by mass of N, and 1 to 3% by mass of V, the balance being Fe and unavoidable impurities.

(8) The method for manufacturing an iron-base sintered alloy material for a valve seat insert according to (6), wherein the first hard-particle powder has a particle diameter distribution with two peak tops at 10 to 40 μm and 40 to 100 μm in particle diameter, and the carbide-type particle powder has a particle diameter distribution (—#100 mesh) passing through a #100 mesh sieve.

(9) The method for manufacturing an iron-base sintered alloy material for a valve seat insert according to any one of (6) to (8), wherein the solid-lubricant particle powder is blended so as 0.2 to 5% by mass of the solid-lubricant particles being dispersed in the matrix phase after sintering.

(10) The method for manufacturing an iron-base sintered alloy material for a valve seat insert according to any one of (6) to (9), wherein the molding and the sintering are repeated multiple times.

(11) A valve seat insert for an internal combustion engine, including an iron-base sintered alloy material manufactured by the method for manufacturing an iron-base sintered alloy material for a valve seat insert according to any one of (6) to (10).

According to an embodiment of the present invention, an iron-base sintered alloy material having high mechanical strength, low aggressiveness to mated material, and excellent wear-resistance simultaneously as a valve seat insert can be manufactured easily and inexpensively, exhibiting a remarkable effect industrially.

BRIEF DESCRIPTION OF DRAWING

FIG. 1 is a view illustrating an outline of a single piece rig wear tester.

DETAILED DESCRIPTION

An embodiment of the present invention is directed to an iron-base sintered alloy material for a valve seat insert of an internal combustion engine, in which first and second hard-particles having different hardness, and optionally a solid-lubricant, are dispersed in a matrix phase.

In the embodiment of the present invention, the two kinds of hard-particles having different hardness are dispersed in the matrix phase.

Hard hard-particles remarkably improve wear-resistance, but have high aggressiveness to mated material. When a large amount of the hard hard-particles are dispersed, a mated material (valve) is worn away significantly. The hard hard-particles have a low diffusion property in sintering, and easily decrease mechanical strength. Therefore, in the embodiment of the present invention, hard-particles having low hardness are dispersed in addition to the hard hard-particles.

In the embodiment of the present invention, Co base inter-metallic compound particles are preferably used as the first hard-particles having high hardness. In the Co base inter-metallic compound particles, inter-metallic compound particles having high hardness are dispersed in a relatively soft Co matrix. The Co base inter-metallic compound particles have high hardness but low aggressiveness to mated material. The Co base inter-metallic compound particles as the first hard-particles have Vickers hardness of 600 to 1200 HV. When hardness is less than 600 NV, hardness of the particles is too low as the first hard-particles to ensure desired wear-resistance. Meanwhile, when hardness is more than 1200 HV, the particles have lowered toughness. As a result, disadvantageously, the particles are easily cracked or chipped, and easily fall off. Vickers hardness of the particles is measured as follows. That is, hardness of five or more particles is measured in conformity to JAS Z 2244 with a Vickers hardness tester (load: 50 gf). The obtained values are arithmetically averaged to obtain hardness of the particles.

Examples of the Co base inter-metallic compound particles include Mo—Si—Fe—Cr type Co base inter-metallic compound particles, Si—Cr—Mo type Co base inter-metallic compound particles, and Si—Ni—Cr—Mo type Co base inter-metallic compound particles. Among these particles, the Mo—Si—Fe—Cr type Co base inter-metallic compound particles are preferable in view of improving wear-resistance. Preferably, the Mo—Si—Fe—Cr type Co base inter-metallic compound particles contain 20 to 60% by mass of Mo, 1 to 10% by mass of Si, and 5 to 70% by mass of one or more kinds selected from Cr, Ni, and Fe, the balance being Co and unavoidable impurities.

The first hard-particles to be used are preferably powder particles having approximately the same particle diameter distribution as the second hard-particles in view of dispersibility of the hard-particles. Use of fine powder particles increases a diffusion property in sintering, leading to an increase in mechanical strength. However, use of only the fine powder particles reduces powder flowability in molding and accelerates cohesion of the particles to thereby lower wear-resistance. Therefore, as the hard-particle powder, powder particles (—#100) having an average particle diameter of 50 to 60 μm are preferably used. Powder particles having an average particle diameter of more than 50 to 60 μm increase aggressiveness to mated material.

In the first hard-particles, more preferably, two kinds of powder particles having different average particle diameters are mixed to be used. In this way, cohesion of the particles can be prevented, uniform dispersion of the particles can be accelerated, and wear-resistance and strength can be improved.

For example, more preferably, mixed powder of powder particles having an average particle diameter of 5 to 40 μm and powder particles having an average particle diameter of 40 to 100 μm is used. By blending fine powder particles having an average particle diameter of 5 to 40 μm in addition to powder particles having an average particle diameter of 40 to 100 μm, a diffusion property in sintering is increased, leading to further improvement of mechanical strength. Powder particles having an average particle diameter of less than 5 μm are too fine. With such particles, therefore, powder flowability in molding is reduced, and the particles are diffused in sintering to disappear.

As the particle diameter of the particles, a value obtained by using a laser diffraction method is used.

In the embodiment of the present invention, in addition to the first hard-particles having high hardness, hard-particles having low hardness are used as the second hard-particles. When only the first hard-particles having high hardness are used in order to increase mechanical strength, aggressiveness to mated material is increased.

Therefore, in place of a part of the first hard-particles having high hardness, the hard-particles having low hardness are used as the second hard-particles. In this way, even when an amount of the hard-particles is increased, strength of the sintered alloy material is not significantly lowered, and wear-resistance can be increased.

In the embodiment of the present invention, carbide-based particles having Vickers hardness of 400 to 700 HV are used as the second hard-particles. The carbide-type particles have a higher diffusion property into the matrix phase in sintering, decrease mechanical strength of the sintered alloy material less, and have lower aggressiveness to mated material than the Co base inter-metallic compound particles. Examples of the carbide-type particles include high-speed tool steel-based particles, preferably containing 0.5 to 1.5% by mass of C, 0.2 to 0.5% by mass of Si, 0.1 to 0.5% by mass of Mn, 2 to 6% by mass of Cr, 3 to 7% by mass of Mo, 4 to 8% by mass of W, and 1 to 3% by mass of V, the balance being Fe and unavoidable impurities.

The carbide-type particles are preferably powder particles having a particle diameter distribution (—#100 mesh) passing through a #100 mesh sieve. Large powder particles having an average particle diameter of more than 150 μm and not passing through a #100 mesh sieve lower a diffusion property in sintering. Therefore, an increase in mechanical strength is not expected. Meanwhile, powder particles having an average particle diameter of less than are too fine. With such particles, therefore, flowability in molding is remarkably lowered. The particles are easily cohered and diffused in sintering to disappear.

The sintered alloy material according to the embodiment of the present invention contains 2 to 45% by mass of the first hard-particles and 2 to 30% by mass of the second hard-particles. The matrix phase has 10 to 50% by mass in total of these two kinds of hard-particles dispersed therein.

When the blending amount of the first hard-particles is less than 2% by mass, desirable wear-resistance cannot be ensured. Meanwhile, when the blending amount of the first hard-particles is large enough to exceed 45% by mass, an effect to wear-resistance is saturated, an effect to match a dispersion amount is not expected, and mechanical strength is remarkably decreased. The blending amount of the first hard-particles is preferably 5 to 40% by mass.

When the blending amount of the second hard-particles is less than 2% by mass, desirable wear-resistance cannot be ensured. Meanwhile, when the blending amount of the second hard-particles is large enough to exceed 30% by mass, an effect of improving wear-resistance is saturated, and mechanical strength is remarkably decreased. The blending amount of the second hard-particles is preferably 5 to 20% by mass.

In the embodiment of the present invention, the first and second hard-particles are included in the matrix phase within the above-described ranges, and in total in 10 to 50% by mass. When the blending amount of the first and second hard-particles in total is less than 10% by mass, desirable wear-resistance cannot be ensured. Meanwhile, when the blending amount of the first and second hard-particles is large enough to exceed 50% by mass, mechanical strength is significantly decreased. Therefore, the total blending amount of the two kinds of hard-particles is limited to a range of 10 to 50% by mass. The blending amount is preferably 15 to 40% by mass.

In the iron-base sintered alloy material according to the embodiment of the present invention, the matrix part including the matrix phase, the hard-particles, and optionally solid-lubricant particles, contains 0.3 to 1.5% by mass of C, and 10 to 50% by mass in total of one or more kinds selected from Si, Mo, Cr, Ni, Co, Mn, S, N, V, Ca, F, Mg, and O, the balance being Fe and unavoidable impurities.

C: 0.3 to 1.5% by Mass

C is an element which increases strength and hardness of a sintered body, and causes metal elements to be easily diffused in sintering. In order to obtain such an effect, the amount of C needs to be 0.3% by mass or more. Meanwhile, when the amount of C is large enough to exceed 1.5% by mass, cementite is easily generated in the matrix, a liquid phase is easily generated in sintering and dimensional accuracy is lowered. Therefore, the amount of C is limited to a range of 0.3 to 1.5% by mass. The amount of C is preferably 0.5 to 1.3% by mass.

One or more kinds selected from Si, Mo, Cr, Ni, Co, Mn, S, N, V, Ca, F, Mg, and O: 10 to 50% by mass in total Each of Si, Mo, Cr, Ni, Co, Mn, S, N, V, Ca, F, Mg, and O is an element which increases strength and hardness of a sintered body, and improves wear-resistance. In order to obtain such an effect, at least one element is selected from the above-described elements including the elements derived from the hard-particles and the solid-lubricant. The amount of the elements needs to be 10% by mass or more in total. Meanwhile, when the amount of the elements exceeds 50% by mass, moldability is lowered, and mechanical strength is also decreased. Therefore, the amount of one or more kinds selected from Si, Mo, Cr, Ni, Co, Mn, S, W, V, Ca, F, Mg, and O is limited to 10 to 50% by mass in total. The amount is preferably 5 to 45% by mass.

The balance other than the above-described components includes Fe and unavoidable impurities.

In the iron-base sintered alloy material according to the embodiment of the present invention, as described above, the matrix phase includes a structure having the above-described hard-particles dispersed and the above-described matrix part composition. The iron-base sintered alloy material has a density of 6.6 g/cm$^3$ or more, and radial crushing strength of 350 MPa or more.

Next, a preferable method for manufacturing the iron-base sintered alloy material according to an embodiment of the present invention will be described.

As raw material powder, iron-based powder, hard-particle powder, powder for an alloy, and optionally solid-lubricant particle powder, are blended and mixed to obtain mixed powder.

Examples of the iron-based powder blended in the mixed powder as one kind of the raw material powder and constituting the matrix phase include atomized pure iron powder, atomized alloy steel powder containing 5% by mass or less of alloy elements, and partially alloyed powder. Preferably, each kind of the powder is used solely or these kinds of powder are blended in combination thereof so as to match a composition of the matrix part after sintering. An average particle diameter of the iron-based powder to be blended is not particularly limited. However, taking dispersion of the hard-particles into consideration, it is preferable to use powder having an average particle diameter approximately the same as or smaller than that of the hard-particle powder. When iron-based powder having a larger average particle diameter than the hard-particle powder is used, it is difficult to disperse the hard-particles uniformly and finely.

In the embodiment of the present invention, the hard-particle powder to be blended in the mixed powder as one kind of the raw material powder includes two kinds of Powder including the first and second hard-particle powder having different hardness. As the first hard-particle powder, Co base inter-metallic compound particle powder having Vickers hardness of 600 to 1200 HV is used. As the second hard-particle powder, carbide-type particle powder having Vickers hardness of 400 to 700 HV is used.

The blending amount of the first hard-particle powder is preferably 2 to 45% by mass with respect to the total amount of the iron-based powder, the hard-particle powder, and the powder for an alloy, such that 2 to 45% by mass of the first hard-particles are dispersed in the matrix phase after sintering. When the blending amount of the first hard-particle powder is less than 2% by mass, it is difficult to secure desired wear-resistance. Meanwhile, when the blending amount exceeds 45% by mass, mechanical strength of the sintered alloy material is decreased. Therefore, the blending amount of the first hard-particle powder is limited to 2 to 45% by mass with respect to the total amount of the iron-based powder, the hard-particle Powder, and the powder for an alloy, such that 2 to 45% by mass of the first hard-particles are dispersed in the matrix phase after sintering.

The blending amount of the second hard-particle powder is 2 to 30% by mass with respect to the total amount of the iron-based powder, the hard-particle powder, and the powder for an alloy, such that 2 to 30% by mass of the second hard-particles are dispersed in the matrix phase after sintering. When the blending amount of the second hard-particle powder is less than 2% by mass, it is difficult to ensure desired wear-resistance. Meanwhile, when the blending amount exceeds 30% by mass, wear-resistance is saturated, and mechanical strength is significantly decreased. Therefore, the blending amount of the second hard-particle powder is limited to 2 to 30% by mass with respect to the total amount of the iron-based powder, the hard-particle powder, and the powder for an alloy, such that 2 to 30% by mass of the second hard-particles are dispersed in the matrix phase after sintering.

The blending amounts of the first and second hard-particle powder are within the above-described ranges, and the blending amount of the hard-particle powder is 10 to 50% by mass in total with respect to the total amount of the iron-based powder, the hard-particle powder, and the powder for an alloy, such that 10 to 50% by mass of the hard-particles are dispersed in the matrix phase after sintering. When the blending amount of the hard-particle Powder is less than 10% by mass, it is difficult to encure desired wear-resistance. Meanwhile, when the blending amount exceeds 50% by mass, mechanical strength of the sintered alloy material is decreased. Therefore, the blending amount of the hard-particle powder is limited to 10 to 50% by mass such that 10 to 50% by mass of the hard-particles are dispersed in the matrix phase after sintering.

As the first hard-particle powder, powder particles (—#100) having an average particle diameter of 50 to 60 µm are preferably used. Powder particles having an average particle diameter of more than 50 to 60 µm increase aggressiveness to mated material. When the average particle diameter is much smaller than the above-described range, powder flowability in molding is reduced. As the first hard-particle powder, particle powder (mixed powder) having a particle diameter distribution with two peak tops at 5 to 40 µm and 40 to 100 µm in particle diameter may be used. By using such particle powder, mechanical strength can be further improved.

Examples of the powder for an alloy to be blended in the mixed powder as one kind of raw material powder include graphite powder, Ni powder, and Co powder. The blending amount of the powder for an alloy is determined appropriately such that a desired composition of the matrix part in the sintered body is obtained. In view of uniform dispersion of the hard-particles, the powder for an alloy to be used preferably has approximately the same particle diameter distribution as the hard-particle powder.

In the embodiment of the present invention, in addition to the above-described powder, 0.2 to 5 parts by mass of a solid-lubricant may be added to the mixed powder with respect to 100 parts by mass of the total amount of the iron-based powder, the powder for an alloy, and the hard-particle powder, such that 0.2 to 5% by mass of the solid-lubricant particles are dispersed in the matrix phase after sintering. The solid-lubricant particles contribute to improving machinability of the valve seat insert, and suppressing adhesion between the valve seat insert and the valve during operation. When the blending amount of the solid-lubricant particles is 0.2 parts by mass or more, such an effect is obtained. When the blending amount of the solid-lubricant particles is less than 0.2 parts by mass, machinability is likely to be deteriorated, and adhesion between the valve seat insert and the valve easily occurs. Meanwhile, even when the blending amount of the solid-lubricant particles is more than 5 parts by mass, the effect is saturated, an effect to match the blending amount is not expected, which is economically disadvantageous, and the strength of the sintered body is decreased. As a result, the blending amount of the solid-lubricant particle Powder is preferably limited to 0.2 to 5 parts by mass with respect to 100 parts by mass of the total amount of the iron-based powder, the powder for an alloy, and the hard-particle powder, such that 0.2 to 5% by mass of the solid-lubricant particles are dispersed in the matrix phase after sintering. As the solid-lubricant, one or more kinds of sulfides such as MnS, $MoS_2$, and $WS_2$, one or more kinds of fluorides such as $CaF_2$, one or more kinds of oxides such as $MgSiO_2$, or a mixture thereof is preferably used.

Subsequently, the mold is filled with the mixed powder blended as described above. Then, the mixed powder is compressed and molded by molding press or the like to obtain a green compact having a predetermined density. Subsequently, the green compact obtained is sintered in a protected atmosphere, preferably while the green compact is heated to a temperature range of 1100 to 1200° C., to obtain the iron-base sintered alloy material. Examples of the protected atmosphere include ammonia cracking gas and vacuum.

A process in which molding P and sintering S are repeated multiple times is preferably used. A 2P2S process in which each of molding and sintering is repeated twice is more preferably used. A 1F1S process in which molding is performed by forging F in place of molding P may be used.

The iron-base sintered alloy material thus obtained is subjected to cutting, grinding, or the like to obtain a valve seat insert for an internal combustion engine having predetermined size and shape.

Example

As raw material powder, iron-based powder of pure iron powder or low alloy steel powder shown in Table 1, powder for an alloy, and hard-particle powder shown in Table 2 were blended, the kinds and the amounts thereof being shown in Table 3. Then, solid-lubricant powder was blended with the resultant mixture, the kinds and the amounts thereof being shown in Table 3. The mixture thus obtained was mixed and kneaded in a V type mixing machine to obtain mixed powder. A blending amount of the solid-lubricant powder is represented by parts by mass with respect to 100 parts by mass of the total amount of the iron-based powder, the powder for an alloy, and the hard-particle powder. A blending amount of each kind of raw material powder other than the solid-lubricant powder is represented by % by mass with respect to the total amount of the iron-based powder, the powder for an alloy, and the hard-particle powder. An average particle diameter of each kind of powder was measured by a laser diffraction method. Hardness of the hard-particle powder was measured as follows. That is, hardness of five or more particles was measured in conformity to JIS Z 2244 under a load of 50 gf. The obtained values were averaged to obtain hardness HV 0.05 of the hard-particle powder.

Subsequently, a mold was filled with the mixed powder. Then, the mixed powder was compressed and molded by molding press to obtain a green compact. Subsequently, the green compact was subjected to a 1P1S process in which sintering was performed in a protected atmosphere (reducing atmosphere) of 1100 to 1200° C. to obtain an iron-base sintered alloy material. A 2P2S process in which each of molding and sintering is repeated twice was partially applied.

A sample for analysis was collected from the obtained iron-base sintered alloy material (sintered body). A content of each element was determined by emission spectrometry to obtain a composition of the matrix part.

A specimen was collected from the obtained sintered body in conformity to JIS Z 2507, and radial crushing strength thereof was measured. The density of the obtained sintered body was measured by the Archimedes method.

The obtained sintered body was subjected to cutting and grinding to obtain a valve seat insert (size and shape: 27 mmφ×22 mmφ×7 mm). A single piece rig wear test was performed using a single piece rig wear tester illustrated in FIG. 1 to evaluate wear-resistance and aggressiveness to mated material. A test method is as follows.

A valve seat insert 1 was press-fitted into a jig 2 corresponding to a cylinder head. Then, a valve 4 was moved vertically by a crank mechanism while the valve 4 and the valve seat insert 1 were heated with a heat source 3 mounted in the tester to perform a test. After the test, wear amounts of the valve and the valve seat insert were measured. Test conditions were as follows.

Test temperature: 250° C. (seat surface)

Test time: 5 hours

Rotation speed of the cam: 3000 rpm

Rotation speed of the valve: 20 rpm

Spring load: 35 kgf (345 N) (when setting)

Lift amount: 8.5 mm

The obtained results are shown in Table 4.

TABLE 1

| Iron-based powder No. | Composition (% by mass) | Average particle diameter (μm) |
|---|---|---|
| a1 | Pure iron powder | 82 |
| a2 | 3.0%Cr—0.22%Mo—0.28%V-bal.Fe | 110 |

TABLE 2

| Hard-particles No. | Kind | Composition (% by mass) | Hardness HV0.05 | Particle diameter distribution Average particle diameter (μm) |
|---|---|---|---|---|
| b1 | Fe—Mo based inter-metallic compound type | 60Mo-bal.Fe | 1200 | 35 |
| b2 | Co-base inter-metallic compound type | 8.5Cr—28.5Mo—2.6Si-bal.Co | 750 | 58 |
| b3 | Carbide-type | 0.9C—0.3Si—0.2Mn—4.1Cr—4.9Mo—5.8W—2.0V-bal.Fe | 600 | 94 (-#100) |
| b4 | Co-base inter-metallic compound type | 8.5Cr—28.5Mo—2.6Si-bal.Co | 750 | 23 |
| b5 | Co-base inter-metallic compound type | 4Cr—45Mo—3Si—10Fe-bal.Co | 1050 | 60 |

TABLE 3

| | Blending amount of raw material powder | | | | | | | | |
|---|---|---|---|---|---|---|---|---|---|
| | Iron-based powder | Powder for alloy | Hard-particle powder | | | | Solid-lubricant powder | | |
| | | | First hard-particle powder | Second hard-particle powder | | | | | |
| Mixed Powder No. | Kind*: blending amount**** (% by mass) | Kind**: blending amount**** (% by mass) | Kind***: blending amount**** (% by mass) | Kind*** | Blending amount**** (% by mass) | Total blending amount**** (% by mass) | Kind | Blending amount**** (% by mass) | Notes |
| A | a1: 58.0 | C: 1.0, Ni: 2.0, Co: 2.0 | b2: 25.0 | b3 | 10.0 | 35.0 | MnS | 2.0 | Example of the present invention |
| B | a1: 58.0 | C: 1.0, Ni: 2.0, Co: 2.0 | b2: 25.0 | b3 | 10.0 | 35.0 | MnS | 2.0 | Example of the present invention |
| C | a1: 58.0 | C: 1.0, Ni: 2.0, Co: 2.0 | b2: 25.0 | b3 | 10.0 | 35.0 | MnS | 2.0 | Example of the present invention |
| D | a1: 58.0 | C: 1.0, Ni: 2.0, Co: 2.0 | b2: 25.0 | b3 | 10.0 | 35.0 | MnS | 2.0 | Example of the present invention |
| E | a1: 48.0 | C: 1.0, Ni: 7.0, Co: 7.0 | b2: 25.0 | b3 | 10.0 | 35.0 | MnS | 2.0 | Example of the present invention |
| F | a1: 74.0 | C: 1.0, Ni: 2.0, Co: 6.0 | b2: 10.0 | b3 | 5.0 | 15.0 | MnS | 2.0 | Example of the present invention |
| G | a1: 48.0 | C: 1.0, Ni: 2.0, Co: 2.0 | b2: 35.0 | b3 | 10.0 | 45.0 | MnS | 2.0 | Example of the present invention |
| H | a2: 58.0 | C: 1.0, Ni: 2.0, Co: 2.0 | b2: 25.0 | b3 | 10.0 | 35.0 | MnS | 2.0 | Example of the present invention |
| I | a1: 56.0 | C: 1.0, Ni: 2.0, Co: 2.0 | b2: 25.0 | b3 | 10.0 | 35.0 | MnS | 4.0 | Example of the present invention |
| J | a1: 59.5 | C: 1.0, Ni: 2.0, Co: 2.0 | b2: 25.0 | b3 | 10.0 | 35.0 | MnS | 0.5 | Example of the present invention |
| K | a1: 58.0 | C: 1.0, Ni: 2.0, Co: 2.0 | b2: 25.0 | b3 | 10.0 | 35.0 | $CaF_2$ | 2.0 | Example of the present invention |
| L | a1: 58.0 | C: 1.0, Ni: 2.0, Co: 2.0 | b2: 25.0 | b3 | 10.0 | 35.0 | $MgSiO_2$ | 2.0 | Example of the present invention |
| M | a1: 28.0 | C: 1.0, Ni: 2.0, Co: 2.0 | b2: 40.0 | b3 | 25.0 | 65.0 | MnS | 2.0 | Comparative example |
| N | a1: 58.0 | C: 1.0, Ni: 2.0, Co: 2.0 | — | b3 | 35.0 | 35.0 | MnS | 2.0 | Comparative example |
| O | a1: 33.0 | C: 1.0, Ni: 2.0, Co: 2.0 | b2: 60.0 | — | — | 60.0 | MnS | 2.0 | Comparative example |

TABLE 3-continued

| | | | Blending amount of raw material powder | | | | | |
|---|---|---|---|---|---|---|---|---|
| | Iron-based powder | Powder for alloy | Hard-particle powder | | | | Solid-lubricant powder | |
| | | | First hard-particle powder | Second hard-particle powder | | | | |
| Mixed Powder No. | Kind*: blending amount****(% by mass) | Kind**: blending amount****(% by mass) | Kind***: blending amount****(% by mass) | Kind*** | Blending amount**** (% by mass) | Total blending amount**** (% by mass) | Kind | Blending amount ****(% by mass) | Notes |
| P | a1: 88.0 | C: 1.0, Ni: 2.0, Co: 2.0 | b2: 3.0 | b3 | 2.0 | 5.0 | MnS | 2.0 | Comparative example |
| Q | a1: 58.0 | C: 1.0, Ni: 2.0, Co: 2.0 | b1: 25.0 | b3 | 10.0 | 35.0 | MnS | 2.0 | Comparative example |
| R | a1: 58.0 | C: 1.0, Ni: 2.0, Co: 2.0 | b5: 25.0 | b3 | 10.0 | 35.0 | MnS | 2.0 | Example of the present invention |
| S | a1: 58.0 | C: 1.0, Ni: 2.0, Co: 2.0 | b2: 20.0, b4: 5.0 | b3 | 10.0 | 35.0 | MnS | 2.0 | Example of the present invention |
| T | a1: 58.0 | C: 1.0, Ni: 2.0, Co: 2.0 | b2: 15.0, b4: 10.0 | b3 | 10.0 | 35.0 | MnS | 2.0 | Example of the present invention |

*Refer to Table 1
**C: graphite powder. Ni: Ni powder. Co: Co powder
***Refer to Table 2
****% by mass with respect to total amount of (iron-based powder + powder for alloy + hard-particle powder + solid-lubricant powder)

TABLE 4

| Sintered body No. | Mixed powder No. | Chemical component of matrix part (% by mass) | | | | | | | | | | Total of others | Balance | Notes |
|---|---|---|---|---|---|---|---|---|---|---|---|---|---|---|
| | | C | Co | Si | Ni | Mo | Cr | Mn | S | W | V | Ca, F, Mg·O | | | |
| 1 | A | 1.1 | 17.0 | 0.7 | 2.0 | 7.6 | 2.5 | 1.2 | 0.8 | 0.6 | 0.2 | | 32.6 | Fe | Example of the present invention |
| 2 | B | 1.1 | 17.0 | 0.7 | 2.0 | 7.6 | 2.5 | 1.2 | 0.8 | 0.6 | 0.2 | | 32.6 | Fe | Example of the present invention |
| 3 | C | 1.1 | 17.0 | 0.7 | 2.0 | 7.6 | 2.5 | 1.2 | 0.8 | 0.6 | 0.2 | | 32.6 | Fe | Example of the present invention |
| 4 | D | 1.1 | 17.0 | 0.7 | 2.0 | 7.6 | 2.5 | 1.2 | 0.8 | 0.6 | 0.2 | | 32.6 | Fe | Example of the present invention |
| 5 | E | 1.1 | 22.0 | 0.7 | 7.0 | 7.6 | 2.5 | 1.2 | 0.8 | 0.6 | 0.2 | | 42.6 | Fe | Example of the present invention |
| 6 | F | 1.0 | 12.0 | 0.3 | 2.0 | 3.1 | 1.1 | 1.2 | 0.8 | 0.3 | 0.1 | | 20.8 | Fe | Example of the present invention |
| 7 | G | 1.1 | 23.0 | 0.9 | 2.0 | 10.5 | 3.4 | 1.2 | 0.8 | 0.6 | 0.2 | | 42.6 | Fe | Example of the present invention |
| 8 | H | 1.1 | 17.0 | 0.7 | 2.0 | 7.7 | 4.3 | 1.2 | 0.8 | 0.6 | 0.4 | | 34.7 | Fe | Example of the present invention |
| 9 | I | 1.1 | 17.0 | 0.7 | 2.0 | 7.6 | 2.5 | 2.4 | 1.6 | 0.6 | 0.2 | | 34.6 | Fe | Example of the present invention |
| 10 | J | 1.1 | 17.0 | 0.7 | 2.0 | 7.6 | 2.5 | 0.3 | 0.2 | 0.6 | 0.2 | | 31.1 | Fe | Example of the present invention |
| 11 | K | 1.1 | 17.0 | 0.7 | 2.0 | 7.6 | 2.5 | 1.2 | 0.8 | 0.6 | 0.2 | Ca: 1.0, F: 1.0 | 34.6 | Fe | Example of the present invention |
| 12 | L | 1.1 | 17.0 | 1.4 | 2.0 | 7.6 | 2.5 | 1.2 | 0.8 | 0.6 | 0.2 | Mg: 0.6, O: 0.8 | 34.7 | Fe | Example of the present invention |
| 13 | M | 1.2 | 26.0 | 1.1 | 2.0 | 12.6 | 4.4 | 1.3 | 0.8 | 1.5 | 0.5 | | 50.2 | Fe | Comparative example |
| 14 | N | 1.3 | 2.0 | 0.1 | 2.0 | 1.7 | 1.4 | 1.3 | 0.8 | 2.0 | 0.7 | | 12.1 | Fe | Comparative example |
| 15 | O | 1.0 | 38.0 | 1.6 | 2.0 | 17.1 | 5.1 | 1.2 | 0.8 | — | — | | 65.8 | Fe | Comparative example |
| 16 | P | 1.0 | 3.8 | 0.1 | 2.0 | 1.0 | 0.3 | 1.2 | 0.8 | 0.1 | — | | 9.3 | Fe | Comparative example |
| 17 | Q | 1.1 | 2.0 | — | 2.0 | 15.5 | 0.4 | 1.2 | 0.8 | 0.6 | 0.2 | | 22.7 | Fe | Comparative example |
| 18 | R | 1.1 | 11.5 | 0.8 | 2.0 | 11.7 | 1.4 | 1.2 | 0.8 | 0.6 | 0.2 | | 30.2 | Fe | Example of the present invention |
| 19 | S | 1.1 | 17.0 | 0.7 | 2.0 | 7.6 | 2.5 | 1.2 | 0.8 | 0.6 | 0.2 | | 32.6 | Fe | Example of the present invention |
| 20 | T | 1.1 | 17.0 | 0.7 | 2.0 | 7.6 | 2.5 | 1.2 | 0.8 | 0.6 | 0.2 | | 32.0 | Fe | Example of the present invention |

TABLE 5

| Sintered body No. | Mixed powder No. | Process | Sintered body Density (g/cm³) | Radial crushing strength (MPa) | Single piece rig wear test Wear amount (μm) Valve seat insert | Valve | Notes |
|---|---|---|---|---|---|---|---|
| 1 | A | 1P1S | 6.65 | 480 | 38.0 | 5.0 | Example of the present invention |
| 2 | B | 1P1S | 6.77 | 540 | 34.5 | 4.5 | Example of the present invention |
| 3 | C | 1P1S | 6.90 | 610 | 39.0 | 4.5 | Example of the present invention |
| 4 | D | 2P2S | 7.25 | 780 | 45.0 | 5.0 | Example of the present invention |
| 5 | E | 1P1S | 6.80 | 470 | 42.0 | 5.0 | Example of the present invention |
| 6 | F | 1P1S | 7.00 | 800 | 74.0 | 5.0 | Example of the present invention |
| 7 | G | 1PIS | 6.90 | 480 | 35.0 | 10.0 | Example of the present invention |
| 8 | H | 1P1S | 6.80 | 470 | 31.0 | 7.0 | Example of the present invention |
| 9 | I | 1P1S | 6.85 | 500 | 40.0 | 4.0 | Example of the present invention |
| 10 | J | 1P1S | 6.90 | 650 | 43.0 | 5.0 | Example of the present invention |
| 11 | K | 1P1S | 6.78 | 470 | 38.0 | 5.0 | Example of the present invention |
| 12 | L | 1P1S | 6.80 | 510 | 36.0 | 5.0 | Example of the present invention |
| 13 | M | 2P2S | 6.83 | 280 | 60.0 | 75.0 | Comparative example |
| 14 | N | 2P2S | 6.97 | 750 | 135.0 | 10.0 | Comparative example |
| 15 | O | 2P2S | 6.50 | 320 | 45.0 | 90.0 | Comparative example |
| 16 | P | 1P1S | 7.02 | 830 | 195.0 | 2.0 | Comparative example |
| 17 | Q | 2P2S | 6.92 | 550 | 120.0 | 45.0 | Comparative example |
| 18 | R | 1P1S | 6.85 | 450 | 24.0 | 10.0 | Example of the present invention |
| 19 | S | 1P1S | 6.82 | 580 | 31.0 | 5.0 | Example of the present invention |
| 20 | T | 1P1S | 6.86 | 640 | 34.0 | 5.0 | Example of the present invention |

Any valve seat insert in the example of the present invention has a small wear amount and excellent wear-resistance. In addition, the valve as a mated material also has a small wear amount, and the valve seat insert has low aggressiveness to mated material. Meanwhile, in a comparative example deviating from the scope of the present invention, one or more characteristics of density, radial crushing strength, wear-resistance, and aggressiveness to mated material were deteriorated.

What is claimed is:

1. An iron-base sintered alloy material for a valve seat insert having an improved wear-resistance, comprising:
   a matrix phase;
   first hard-particles; and
   second hard-particles,
   wherein the first and second hard-particles have hardness different from each other and are dispersed in the matrix phase,
   a matrix part including the matrix phase and the two kinds of hard-particles contains 0.3 to 1.5% by mass of C, and 10 to 50% by mass in total of one or more kinds selected from Si, Mo, Cr, Ni, Co, Mn, S, W, V, Ca, F, Mg, and O, the balance being Fe and unavoidable impurities,
   the first hard-particles are Co base inter-metallic compound particles having an average particle diameter of 50 to 60 μm and a Vickers hardness of 600 to 1200 HV,
   the second hard-particles are high-speed tool steel-based, carbide-containing particles having a Vickers hardness of 400 to 700 HV, said second hard-particles being a blending powder having a particle size distribution (−#100 mesh) passing through a #100 mesh sieve,
   the material has a structure including 25 to 45% by mass of the first hard-particles and 2 to 30% by mass of the second hard-particles, in which 35 to 50% by mass in total of the two kinds of hard-particles are dispersed, and
   the material has a density of 6.6 g/cm$^3$ or more and radial crushing strength of 350 MPa or more.

2. The iron-base sintered alloy material for a valve seat insert according to claim 1, wherein
   the Co base inter-metallic compound particles contain 20 to 60% by mass of Mo, 1 to 10% by mass of Si, and 5 to 70% by mass in total of one or two kinds selected from Cr and Fe, the balance being Co and unavoidable impurities, and
   the high-speed tool steel-based, carbide-containing particles contain 0.5 to 1.5% by mass of C, 0.2 to 0.5% by mass of Si, 0.1 to 0.5% by mass of Mn, 2 to 6% by mass of Cr, 3 to 7% by mass of Mo, 4 to 8% by mass of W, and 1 to 3% by mass of V, the balance being Fe and unavoidable impurities.

3. The iron-base sintered alloy material for a valve seat insert according to claim 2, wherein
   the Co base inter-metallic compound particles are blended in the form of mixed powder obtained by blending powder particles having an average particle diameter of 5 to 40 μm and powder particles having an average particle diameter of 40 to 100 μm.

4. The iron-base sintered alloy material for a valve seat insert according to claim 1, wherein
   in addition to the hard-particles, 0.2 to 5% by mass of solid-lubricant particles are dispersed in the matrix phase.

5. The iron-base sintered alloy material for a valve seat insert according to claim 2, wherein
   in addition to the hard-particles, 0.2 to 5% by mass of solid-lubricant particles are dispersed in the matrix phase.

6. The iron-base sintered alloy material for a valve seat insert according to claim 3, wherein
   in addition to the hard-particles, 0.2 to 5% by mass of solid-lubricant particles are dispersed in the matrix phase.

7. A method for manufacturing an iron-base sintered alloy material for a valve seat insert, comprising:
   blending and mixing, as raw material powder, iron-based powder, hard-particle powder, powder for an alloy, and optionally solid-lubricant particle powder to obtain mixed powder;
   putting the mixed powder into a mold for molding to obtain a green compact having predetermined shape and density; and
   sintering the green compact to obtain a sintered body, wherein
   the hard-particle powder contains first hard-particle powder and second hard-particle powder,
   the first hard-particle powder is Co base inter-metallic compound particle powder having an average particle diameter of 50 to 60 μm, Vickers hardness of 600 to 1200 HV,
   the second hard-particle powder is high-speed tool steel-based, carbide-containing particle powder having Vickers hardness of 400 to 700 HV, and
   the raw material powder is blended such that a matrix part including a matrix phase and hard-particles after sintering contains 0.3 to 1.5% by mass of C, and 10 to 50% by mass in total of one or more kinds selected from Si, Mo, Cr, Ni, Co, Mn, S, W, V, Ca, F, Mg, and O, the balance being Fe and unavoidable impurities, and a structure after sintering includes 25 to 45% by mass of the first hard-particles and 2 to 30% by mass of the second hard-particles, in which 35 to 50% by mass in total of these two kinds of hard-particles are contained, to obtain the sintered body having a density of 6.6 g/cm$^3$ or more and radial crushing strength of 350 MPa or more.

8. The method for manufacturing an iron-base sintered alloy material for a valve seat insert according to claim 7, wherein
   the Co base inter-metallic compound particle powder contains 20 to 60% by mass of Mo, 1 to 10% by mass of Si, and 5 to 70% by mass in total of one or more kinds selected from Cr and Fe, the balance being Co and unavoidable impurities, and
   the high-speed tool steel-based, carbide-containing particle powder contains 0.5 to 1.5% by mass of C, 0.2 to 0.5% by mass of Si, 0.1 to 0.5% by mass of Mn, 2 to 6% by mass of Cr, 3 to 7% by mass of Mo, 4 to 8% by mass of W, and 1 to 3% by mass of V, the balance being Fe and unavoidable impurities.

9. The method for manufacturing an iron-base sintered alloy material for a valve seat insert according to claim 7, wherein
   the first hard-particle powder has a particle diameter distribution with two peak tops at 5 to 40 μm and 40 to 100 μm in particle diameter.

10. The method for manufacturing an iron-base sintered alloy material for a valve seat insert according to claim 7, wherein
    the solid-lubricant particle powder is blended so as 0.2 to 5% by mass of the solid-lubricant particle being dispersed in the matrix phase after sintering.

11. The method for manufacturing an iron-base sintered alloy material for a valve seat insert according to claim 10, wherein
the molding and the sintering are repeated multiple times.

12. The method for manufacturing an iron-base sintered alloy material for a valve seat insert according to claim 7, wherein
the molding and the sintering are repeated multiple times.

13. A valve seat insert for an internal combustion engine, comprising:
an iron-base sintered alloy material manufactured by the method for manufacturing an iron-base sintered alloy material for a valve seat insert according to claim 7.

14. A valve seat insert for an internal combustion engine, comprising:
an iron-base sintered alloy material manufactured by the method for manufacturing an iron-base sintered alloy material for a valve seat insert according to claim 10.

15. A valve seat insert for an internal combustion engine, comprising:
an iron-base sintered alloy material manufactured by the method for manufacturing an iron-base sintered alloy material for a valve seat insert according to claim 12.

16. A valve seat insert for an internal combustion engine, comprising:
an iron-base sintered alloy material manufactured by the method for manufacturing an iron-base sintered alloy material for a valve seat insert according to claim 11.

17. The method for manufacturing an iron-base sintered alloy material for a valve seat insert according to claim 8, wherein
the solid-lubricant particle powder is blended so as 0.2 to 5% by mass of the solid-lubricant particle being dispersed in the matrix phase after sintering.

18. The method for manufacturing an iron-base sintered alloy material for a valve seat insert according to claim 9, wherein
the solid-lubricant particle powder is blended so as 0.2 to 5% by mass of the solid-lubricant particle being dispersed in the matrix phase after sintering.

* * * * *